Figure 1:
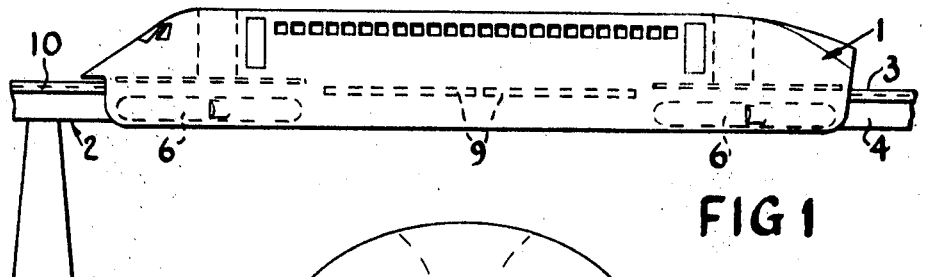

[11] 3,585,939

| [72] | Inventors | Eric Roberts Laithwaite<br>Surbiton;<br>Denys Stanley Bliss, Comberton, both of,<br>England |
|---|---|---|
| [21] | Appl. No. | 860,948 |
| [22] | Filed | Sept. 25, 1969 |
| [45] | Patented | June 22, 1971 |
| [73] | Assignee | Tracked Hovercraft Limited<br>London, England |
| [32] | Priority | Sept. 26, 1968 |
| [33] | | Great Britain |
| [31] | | 45727/68 |

[54] LINEAR INDUCTION MOTOR FOR VEHICLE PROPULSION
6 Claims, 7 Drawing Figs.

[52] U.S. Cl. ................................................ 104/148
LM, 104/23 FS, 310/13
[51] Int. Cl. .................................................. B61b 13/00
[50] Field of Search............................................. 104/148
LM, 23 FS; 310/12, 13; 180/7

[56] References Cited
UNITED STATES PATENTS

| 3,225,228 | 12/1965 | Roshala.................. | 104/148 LM |
| 3,369,497 | 2/1968 | Driver et al................ | 104/23 FS |
| 3,385,228 | 5/1968 | Kwangho-Chung......... | 104/148 LM |
| 3,516,361 | 6/1970 | Hart............................ | 104/23 FS |

*Primary Examiner*—Drayton E. Hoffman
*Attorney*—Cameron, Kerkam and Sutton

ABSTRACT: A tracked Hovercraft is propelled by a linear induction motor having a stator connected to the vehicle which cooperates with a platelike reaction rail mounted along the length of a corner of the track. The rail is parallel with one track surface and is transverse to the other track surface of the corner. The stator has two interconnected parts on opposite sides of the rail, only one of the stator parts carrying electrically energizable windings with projecting end turns and the other stator part being a block of magnetic material. The block part is disposed on the side of the rail that forms an angle with a track surface. This arrangement enables the stator to be closer to the track and saves expensive reaction rail material.

PATENTED JUN22 1971

3,585,939

SHEET 1 OF 2

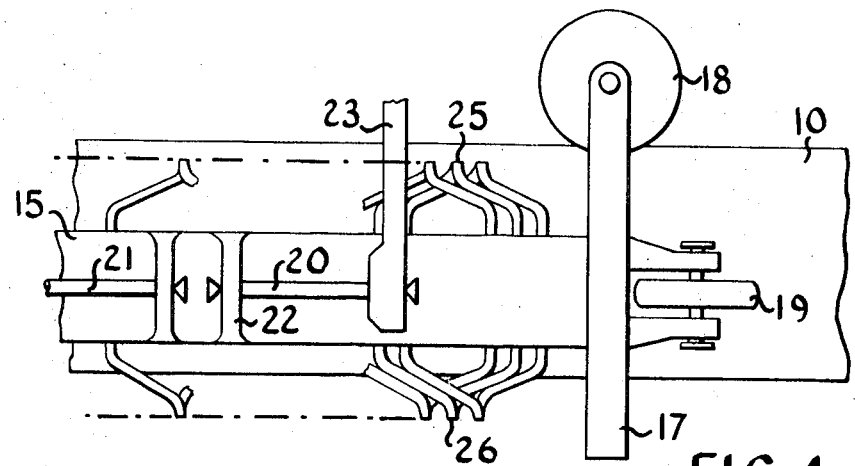
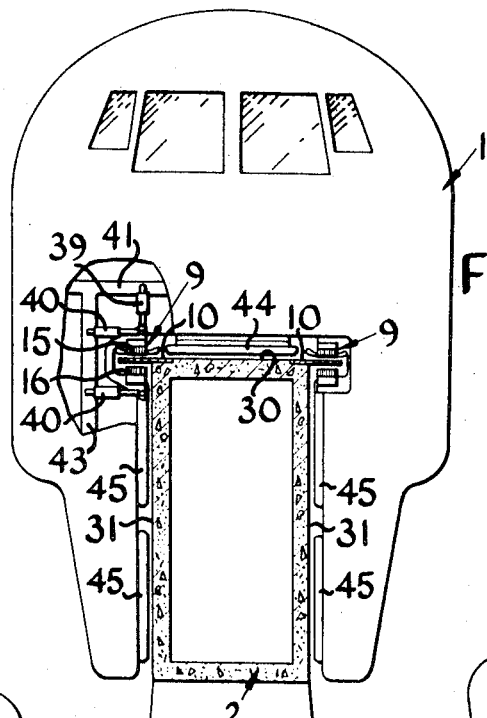
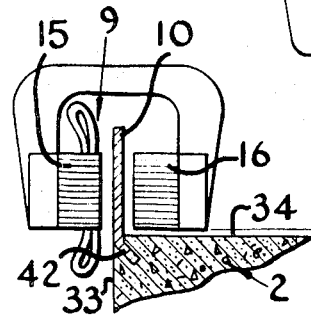
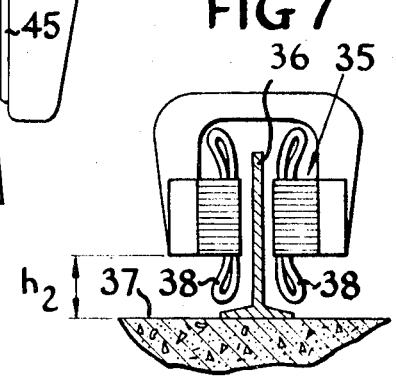

LINEAR INDUCTION MOTOR FOR VEHICLE PROPULSION

In the book "Propulsion without Wheels" by Eric Roberts Laithwaite, published in 1966 by the English University Press Ltd., there is an explanation of the operation of the linear induction motor. In British Patent Specification No. 1002588 as well as in "Propulsion without Wheels" there is a description of the use of a linear induction motor with a double sided stator connected to a vehicle for propelling it. The present invention is concerned with the use of a linear induction motor for vehicle propulsion and has as one of its objects to keep to a minimum the amount of material needed for the reaction rail which serves as a rotor for the motor.

According to the invention a platelike reaction rail is mounted along the length of a track which has at least two surfaces which meet at an angle as seen in a transverse cross section. The rail projects from the angle of the track so that the rail lies generally in a plane parallel to a first of said two track surfaces and transverse to the second surface. The stator has two interconnected parts disposed in use on opposite sides of the rail, only one of the stator parts carrying electrically energizable windings with projecting end turns, and the other being a block of magnetic material which forms part of the magnetic circuit of the motor. The block part of the stator is disposed on the side of the rail that forms an angle with the second said track surface.

This arrangement has the advantage that there are no projecting end turns on the block which could contact the track and therefore the width of the reaction rail can be made smaller than if there were end turns. The block is so disposed in use that if it had end turns similar to the end turns of the other stator part, the imaginary end turns of the block would extend through said second track surface. The electrically energizable stator part is disposed on the side of the reaction rail which is in the same general plane as one of the track surfaces, and therefore, its end turns will not contact the track. Although particularly relevant to linear induction motors in which loops of working magnetic flux are produced by face windings arranged on a stator part, the invention is also relevant to linear induction motors of other forms, such as Gramme-ring wound motors. The invention is not as advantageous for Gramme-ring wound motors since the end turns tend to be smaller than for motors with face windings.

The two track surfaces preferably meet at a right angle but the angle could be smaller or greater. However, the more the angle deviates from a right angle the less benefit from the invention there will be.

As well as providing a saving in expensive reaction rail material, for instance aluminum, there is also the advantage that a narrower reaction rail is less liable to structural instability. The rail must of course, be capable of taking both propulsive and braking forces and may be required to support and guide the stator.

Hitherto the problem of accommodating the end turns has made it desirable to form them as compactly as possible, and has therefore increased the difficulty of cooling the end turns. With the arrangement according to the invention it is no longer necessary to make the end turns so small and therefore they can be cooled more easily. This may make it possible to increase the rating of the motor.

The arrangement of the motor according to the invention can be regarded as being single sided electrically, but double sided magnetically. Single sided motors are described in "Propulsion without Wheels." The penalty for adopting an arrangement which is single sided electrically is that such designs may require wider slots and narrower teeth than those of the electrically double sided stator, an this will result in a lower value of tractive force per unit area of pole surface. The electrically single sided arrangement will therefore be longer and heavier than the electrically double sided stator by a factor of between 1 and 2 depending on the copper/iron ratio employed.

The arrangement can be used to propel a train having wheels running on rails or it can be used with a tracked Hovercraft, that is easy to say, a gas supported vehicle for travelling along a prepared track which serves to guide the vehicle.

The rail can be mounted anywhere on the track where it can cooperate with a stator connected to the vehicle. The rail could, for example, be centrally placed on a track, where a step can be provided to create the two track surfaces for the mounting of the rail. In one arrangement a single rail projects downwardly from a lateral extension on one side of the track. In another arrangement the rail projects laterally from the side of the track with the upper face of the rail generally in the plane of the upper surface of the track, said second track surface being constituted by s substantially vertical side surface of the track.

There could be two rails one on each side of the track, for each of two stators on opposite sides of the vehicle.

Figure 2:
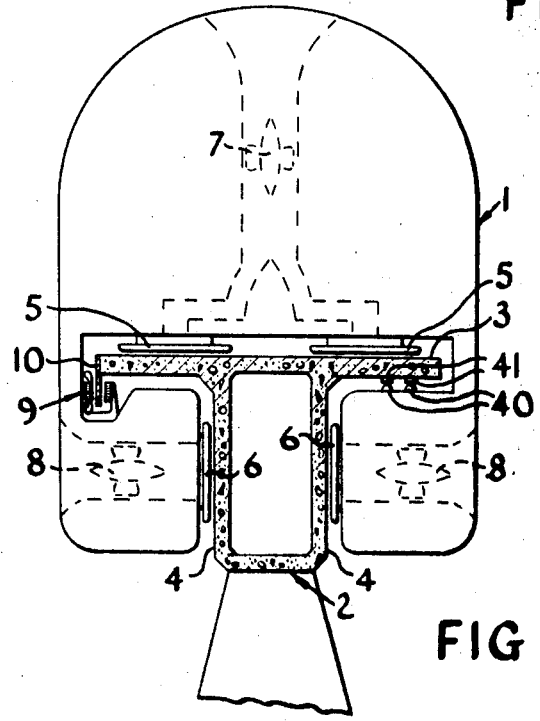
Figure 3:
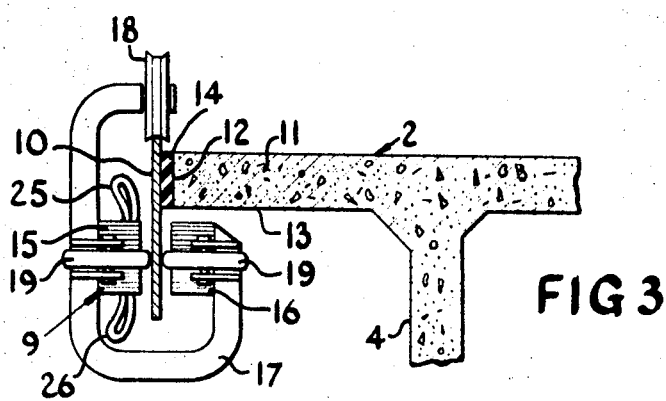

In the accompanying drawings:

FIG. 1 is a diagrammatic side view of a tracked Hovercraft on its track,

FIG. 2 is an enlarged transverse cross section of the Hovercraft shown in FIG. 1, showing schematically one possible arrangement of a linear induction motor according to the invention, FIGS. 3 and 4 show in end view and side view respectively details of the mounting of the linear motor shown in FIG. 2, FIG. 5 is a diagrammatic transverse cross section of a tracked Hovercraft on a rectangular track showing an arrangement of two linear induction motors according to the invention, FIG. 6 shows diagrammatically an alternative arrangement using the invention, and FIG. 7 shows a known arrangement of a linear motor for vehicle propulsion.

FIGS. 1 and 2 show a tracked Hovercraft mounted on a track 2. The track 2 has a horizontal supporting surface 3 and vertical guiding surfaces 4. The vehicle 1 has air cushion devices or hoverpads 5 for supporting the vehicle from the surface 3, and air cushion devices or hoverpads 6 for guiding the vehicle from the surfaces 4. The hoverpads 5 and 6 are fed by fans 7 and 8. The operation of the tracked Hovercraft is known from British Pat. No. 955,127.

The vehicle 1 is propelled by a linear induction motor which makes it capable of high speeds, for example greater than 200 kilometers per hour. The motor consists of stators 9 connected to the vehicle, the stators 9 cooperating with a rotor in the form of a platelike reaction rail 10 fixed along the length of the track 2. As can be seen from FIG. 1 there are two linear motor stators 9 in tandem, and as can be seen in FIG. 2 that rail 10 is fixed along one side of the track 2. The rail is formed of a nonmagnetic electrically conducting material, e.g. aluminum.

Direct current is collected by two current collectors 40 which contact conductors 41 extending along the length of the track 2. The direct current is converted to polyphase alternating current on the vehicle before being fed to the stators 9.

FIGS. 3 and 4 show a stator 9 and rail 10 in more detail. The rail 10 projects downwardly from a lateral extension 11 on one side of the track 2. The extension 11 has a vertical surface 12 and a horizontal surface 13 which meet at a right angle. The plate 10 is spaced from the surface 12 by a rubber block 14 to provide a resilient mounting, and is connected to the track 2 by bolts which extend through the plate 10, rubber block 14 and into the extension 11. The plate 10 is parallel to the track surface 12 and hence meets the surface 13 at a right angle.

The stator 9 has two parts 15 and 16 interconnected by a rigid member 17. Only the part 15 carries electrically energizable windings with projecting end turns, the other part being a block of magnetic material which forms a part of the magnetic circuit of the motor. The block part 16 is disposed on the side of the rail 10 which forms an angle with the track surface 13. The stator 9 is supported from the upper edge of the rail 10 by flanged wheels 18, there being one wheel 18 at each end of the stator 9. The stator parts 15 and 16 are spaced from the rail 10 by opposed pairs of wheels 19 at each end of the stator 9.

Traction forces are transmitted from the stator 9 to the vehicle 1 by drag links 20 and 21 shown diagrammatically in FIG. 4. The links 20 interconnect lugs 22 rigidly fixed to the stator part 15 with a member 23 which forms a structural part of the vehicle 1. When the stator 9 moves to the left as seen in FIG. 4 a tractive force will be transmitted to the vehicle by the link 20. When the stator is used to brake the vehicle the braking force will be transmitted to the vehicle by the link 21. The mounting of the links 20 and 21 allows some vertical and lateral movement of the vehicle 1 relative to the stator 9 which may result from aerodynamic or other forces acting on the vehicle 1.

The arrangement of the windings on the stator part 15 is similar to the arrangement in a conventional electrically double sided stator and will not be described. The block 16 is a laminated block of steel and serves to complete the magnetic circuit of the motor. The windings on the stator part 15 have projecting end turns 25 and 26 projecting about 15 centimeters from its upper and lower sides. The height of the stator part is also about 15 centimeters. The block part 16 has no end turns and this enables the whole stator 9 to be about 15 centimeters closer to the track surface 13 than would otherwise be possible since no clearance has to be allowed between the part 16 and the surface 13 to accommodate the end turns.

FIG. 5 shows diagrammatically another arrangement in which a rail 10 projects laterally from each side of the track 2 with the upper faces of the rails generally in the plane of the upper surface 30 of the track. Each plate 10 meets a substantially vertical side surface 31 of the track at a right angle. As shown in FIG. 5 the block part 16 of each stator 9 is disposed on the side of a plate 10 that meets the surface 31 at a right angle.

Each stator 9 is supported and guided by servo actuators at their ends. Hydraulic jacks 39 compensate for relative movement between the stators 9 and the vehicle 1 in vertical planes and also compensate for displacement of the rails 10. By these means, the air gaps between the stator parts and the rail are held substantially constant. Hydraulic jacks 40 compensate for relative lateral displacements between the vehicle 1 and stators 9. The stators 9 are linked to vehicle structural members 41 by the jacks 39 and to structural members 43 by the jacks 40. The vehicle 1 is supported from the upper surface 30 of the track 2 by the air cushion devices 44 and guided from side surfaces 31 of the track 2 by further air cushion devices 45.

FIG. 6 shows yet another arrangement in which the rail 10 projects upwardly from one side of the track 2. One face of the rail 10 is generally in line with the vertical surface 33 of the track, and meets the horizontal surface of the track 34 at a right angle. The block part 16 of the stator 9 is disposed on the side of the rail 10 that meets the surface 34 at a right angle. The plate 10 is anchored in the concrete track 2 by an angled extension 42. An advantage of the invention having the configuration shown in FIG. 6 is that the block 16 is more robust than an electrically energizable stator part and is therefore better able to deal with obstacles such as stones which it may encounter on the track surface 34.

FIG. 7 shows diagrammatically a known form of electrically double sided stator 35 cooperating with a vertical platelike rail 36 projecting upwardly from a horizontal track surface 37. Each of the two stator parts carry end turns 38 and therefore a wide clearance $h_2$ has to be provided. A comparison with FIG. 6 where the clearance is indicated by $h_1$ shows immediately that there is a great saving in rail material. If the block 16 in FIGS. 3, 5 and 6 were imagined to have projecting end turns similar to the end turns of the stator part 15, imaginary end turns of the block 16 would extend through the track surface 13, 31 and 34 respectively.

Not only does the invention provide a saving in rail material but it also helps to solve the problems of providing a rail capable of withstanding the forces to which it is subject.

We claim:
1. A linear induction motor in combination with a vehicle and a track along which it runs, the track having at least two surfaces which meet at an angle as seen in a transverse cross section, the motor including a stator connected to the vehicle and a platelike reaction rail forming the rotor, in which the improvement comprises:
   a. the reaction rail is mounted along the length of the track projecting from said angle of the track so that, as seen in a traverse cross section the rail lies in a plane generally parallel to a first of said two track surfaces and transverse to the second of said track surfaces, and
   b. the stator has two interconnected parts disposed in use on opposite sides of the rail, one of the stator parts only carrying electrically energizable windings with projecting end turns and the other part being a block of magnetic material which forms a part of the magnetic circuit of the motor, the block part of the stator being disposed in use on the side of the rail which forms an angle with the second said track surface.

2. The combination as claimed in claim 1 with the block so disposed that if the block were imagined to have projecting end turns similar to the end turns of the other stator part, imaginary end turns of the block would extend through said second track surface.

3. The combination as claimed in claim 1 in which the rail projects downwardly from a lateral extension on one side of the track, the underneath surface of the extension constituting said second track surface.

4. The combination as claimed in claim 1 in which the rail projects laterally from the side of the track with the upper face of the rail generally in the plane of the upper surface of the track, said second track surface being constituted by a substantially vertical side surface of the track.

5. The combination as claimed in claim 1 in which there are two reaction rails one on each side of the track for each of two stators on opposite sides of the vehicle.

6. The combination as claimed in claim 1 in which the vehicle is arranged to be supported on said track by gas pressure.